United States Patent
Robinson et al.

(10) Patent No.: US 9,170,831 B2
(45) Date of Patent: Oct. 27, 2015

(54) CLONING VIRTUAL MACHINES

(71) Applicant: NetApp Inc., Sunnyvale, CA (US)

(72) Inventors: Matthew Douglas Robinson, Katonah, NY (US); Peter R. Learmonth, San Jose, CA (US); Michael Vaughn Stewart, Hillsborough, NC (US); Eric Paul Forgette, Mechanicsville, VA (US)

(73) Assignee: NETAPP, INC., Sunnyvale, CA (US)

( * ) Notice: Subject to any disclaimer, the term of this patent is extended or adjusted under 35 U.S.C. 154(b) by 210 days.

(21) Appl. No.: 13/974,331

(22) Filed: Aug. 23, 2013

(65) Prior Publication Data

US 2013/0346976 A1 Dec. 26, 2013

Related U.S. Application Data

(63) Continuation of application No. 12/268,690, filed on Nov. 11, 2008, now Pat. No. 8,566,821.

(51) Int. Cl.
| | |
|---|---|
| *G06F 9/46* | (2006.01) |
| *G06F 11/00* | (2006.01) |
| *G06F 9/455* | (2006.01) |
| *G06F 9/48* | (2006.01) |
| *G06F 9/50* | (2006.01) |
| *G06F 17/30* | (2006.01) |
| *G06F 11/14* | (2006.01) |

(52) U.S. Cl.
CPC ............ *G06F 9/45533* (2013.01); *G06F 9/485* (2013.01); *G06F 9/5077* (2013.01); *G06F 17/30088* (2013.01); *G06F 9/45558* (2013.01); *G06F 11/1469* (2013.01)

(58) Field of Classification Search
CPC .......................... G06F 9/45558; G06F 11/1469
See application file for complete search history.

(56) References Cited

U.S. PATENT DOCUMENTS

| | | | |
|---|---|---|---|
| 6,247,024 | B1 | 6/2001 | Kincaid |
| 6,889,228 | B1 | 5/2005 | Federwisch |
| 7,143,307 | B1 | 11/2006 | Witte et al. |
| 7,194,595 | B1 | 3/2007 | Fair et al. |
| 7,243,207 | B1 | 7/2007 | Prakash et al. |
| 7,321,962 | B1 | 1/2008 | Fair et al. |
| 7,334,095 | B1 | 2/2008 | Fair et al. |
| 7,415,708 | B2 | 8/2008 | Knauerhase et al. |

(Continued)

OTHER PUBLICATIONS

Int. Search Report cited in PCT Application No. PCT/US2009/064030 dated Feb. 22, 2010, 13 pgs.

(Continued)

*Primary Examiner* — Camquy Truong
(74) *Attorney, Agent, or Firm* — Klein, O'Neill & Singh, LLP

(57) ABSTRACT

While current solutions for cloning virtual machines can involve copying and duplicating files associated to a virtual machine (VM), systems and techniques can be devised to create thin clones of a VM using the VM's associated storage system to copy and deduplicate storage for the VMs. One can create a base VM in a directory of a storage container attached to a hypervisor, and then map the storage container to a volume on a storage system. One can clone the base VM using a snapshot of respective files associated to the base VM, which can comprise creating metadata that identified a physical storage location of the files. Further, the metadata can then be copied to a desired location on the storage container, to create a VM clone. Once copied, the cloned VM can be customized and registered within the hypervisor.

20 Claims, 7 Drawing Sheets

(56) References Cited

U.S. PATENT DOCUMENTS

| | | |
|---|---|---|
| 7,457,982 B2 | 11/2008 | Rajan |
| 7,593,948 B2 | 9/2009 | Suggs et al. |
| 7,624,106 B1 | 11/2009 | Manley et al. |
| 7,693,877 B1 | 4/2010 | Zasman |
| 7,730,277 B1 | 6/2010 | Prakash et al. |
| 7,734,951 B1 | 6/2010 | Balasubramanian et al. |
| 7,756,832 B1 | 7/2010 | Mowry et al. |
| 7,904,748 B2 | 3/2011 | Witte et al. |
| 7,954,150 B2 | 5/2011 | Croft et al. |
| 7,971,094 B1 | 6/2011 | Benn et al. |
| 8,078,622 B2 | 12/2011 | Rabii et al. |
| 8,112,661 B1 | 2/2012 | La France et al. |
| 8,176,012 B1 | 5/2012 | Rabii et al. |
| 2006/0179261 A1 | 8/2006 | Rajan |
| 2008/0098309 A1 | 4/2008 | Fries et al. |
| 2008/0155169 A1 | 6/2008 | Hiltgen et al. |

OTHER PUBLICATIONS

Int. Preliminary Report on Patentability cited in PCT Application No. PCT/US20091064030 dated May 17, 2011, 8 pgs.

Non-Final Office Action cited in U.S. Appl. No. 12/268,690 dated Mar. 15, 2012, 18 pgs.

Reply Non-Final Office Action cited in U.S. Appl. No. 12/268,690 dated Jun. 15, 2012, 11 pgs.

Final Office Action cited in U.S. Appl. No. 12/268,690 dated Aug. 17, 2012, 24 pgs.

Reply Final Office Action cited in U.S. Appl. No. 12/268,690 dated Nov. 19, 2012, 13 pgs.

Notice of Allowance cited in U.S. Appl. No. 12/268,690 dated Jun. 19, 2013, 37 pgs.

CLONING VIRTUAL MACHINES

RELATED APPLICATIONS

This application is a continuation of U.S. application Ser. No. 12/268,690, filed on Nov. 11, 2008, entitled "CLONING VIRTUAL MACHINES", at least some of which may be incorporated herein.

BACKGROUND

In a computing environment, virtual machines may be used to concurrently run multiple operating systems on a single physical computer system, for example, to isolate test and beta versions of computer program modules, without affecting other systems, such as virtual machines, on a computer system. Physical servers can be converted into virtual servers running a hypervisor, which allows one or more virtual machines to run on a single physical server. A cluster of virtual servers may be linked to a storage volume that can be used to back up data from the plurality of virtual servers. Further, virtual machines may be used to separate storage on a computer system, in order to create isolated storage systems. Virtual machines operate in a hypervisor environment, whereby a hypervisor interacts with physical devices, such as processors, input/output devices, memory and storage, and the hypervisor emulates a capability of these devices to the virtual machines.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

A plurality of virtual machines (VMs) can be installed on one or more physical machines, for example, to maintain different operating systems for running beta tests on programming, to operate separate workstations, or to maintain separate servers on a limited physical system. As an example, an enterprise system that maintains a networked storage system may operate a plurality of VMs for use by users of the system. In this example, groups of VMs may be consolidated on servers running a hypervisor environment. Further, data management and storage servers may be consolidated as virtual servers on physical servers in the enterprise storage system, for example, so that individual virtual servers are relatively isolated from each other.

In this example, in certain situations an enterprise may wish to add VMs to the enterprise system, but operating needs and storage needs of the individual groups or functions may not require an entire server. In these situations, cloning VMs and even cloning a storage container that holds the VMs on a storage volume (e.g., a storage server) in the enterprise storage system may be appropriate. Present solutions to VM cloning, for example, include copying of files associated to the VM to another location in the storage container, thereby creating a clone of a base VM. In this example, the copy of VM files can duplicate data on a same storage container for a clone of the base VM. Further, copying of files associated to a base VM can be cumbersome, requiring time during which computer resources can be tied up. Additionally, cloning a storage container (e.g., within a storage volume) comprising duplicate copies of VM files can create multiple duplicate copies of VM files on a same storage volume, and can be very computer resource intensive.

Techniques and systems are disclosed herein for creating thin clones (e.g., clones that do not have copies of all files associated with a base VM) of a virtual machine (VM) using the VM's associated storage system to copy and deduplicate storage for the VMs. In one embodiment, in an example method, one can create a base VM in a directory of a storage container (e.g., a data store) that is attached to a hypervisor (e.g., VMware). In this example, a base VM can comprise a preferred configuration for creating clones. One can map the storage container to a volume on a storage system, for example, so that a location of the base VM is known. Further, a snapshot of the files associated to the base VM can be taken (e.g., a read-only, point-in-time representation of file location and configurations), which can comprise creating metadata that identifies a physical location of the files associated to the base VM. Additionally, the metadata can be copied to a desired location on the storage container, for example, creating a clone of the base VM without duplicating the files associated to the VM.

In this embodiment, once the clone VM is created, it can be customized (e.g., individualized) by modifying one or more of its parameters. As an example, modifying the parameters can be performed manually, or by using an API. Further, once customized, the VM clone can be registered with the hypervisor environment.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
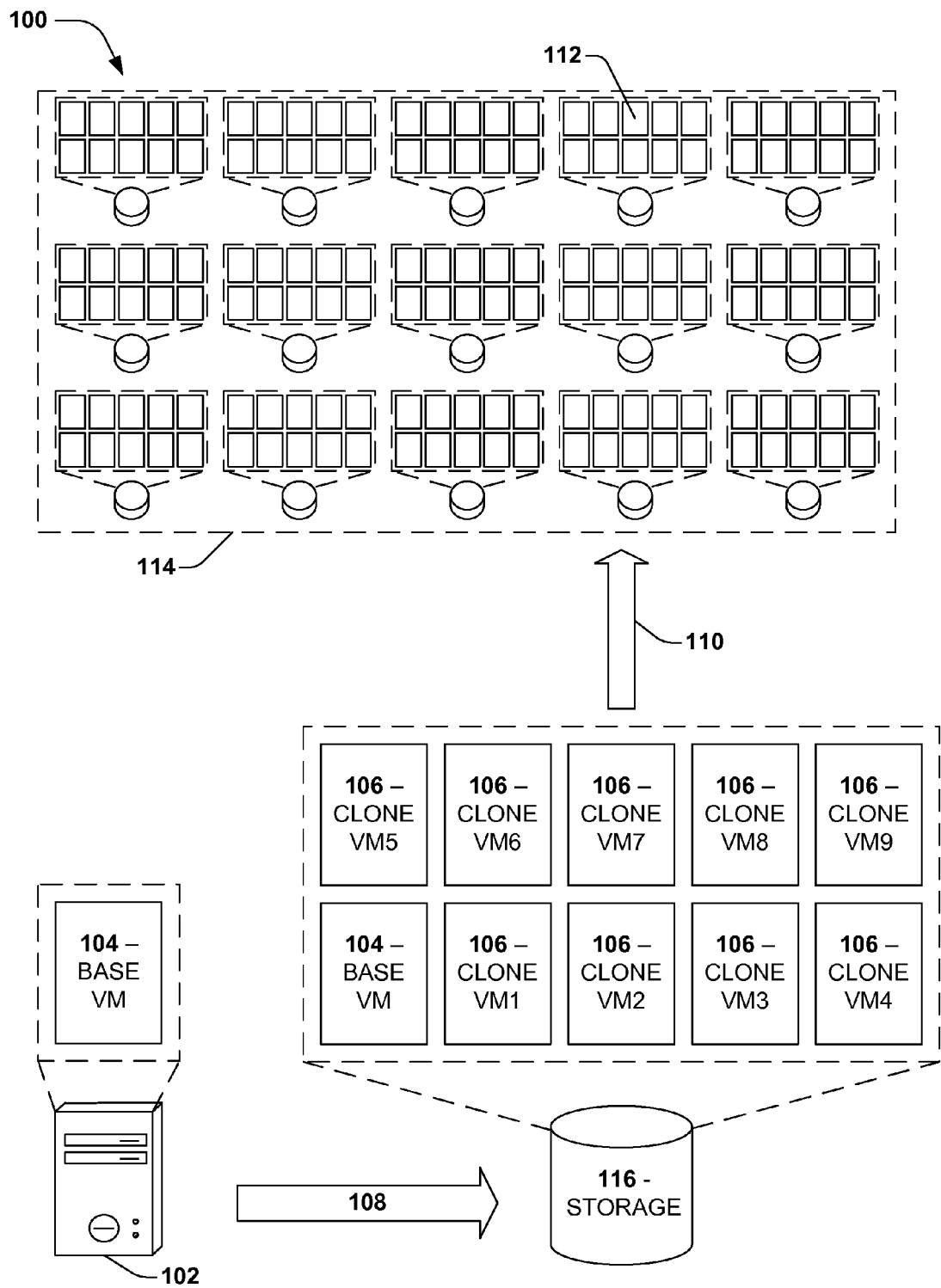
FIG. 1 is an illustration of an example embodiment of cloning a virtual machine and a storage container that comprises the virtual machine.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

Embodiments described herein relate to techniques and systems for creating thin clones of a virtual machine (VM) using the VM's associated storage system to copy and deduplicate storage for the VMs.

FIG. 1 is an illustration of an example embodiment 100 of cloning a virtual machine (VM) and a storage container that comprises the VM. In this embodiment 100 a server 102 (e.g., a storage server), which operates a hypervisor environment, for example, has a base VM 104 installed thereon. As an example, a base VM may serve as a base framework of an operating system, applications and system configurations that can be cloned and later customized by an enterprise system.

In the example embodiment 100, the base VM 104 can be cloned 108 on a storage volume 116 in the server 102 to create a plurality of cloned VMs 106, along with the base VM 104, on the storage volume 116 of the server 102. In this way, for example, one may create many clones of a VM that has been designed with a base framework of an operating system, applications and configurations that are specified to run in an enterprise system. In this example, an enterprise that may need large pools of identical VMs can manage specifications of VMs running in a system, while taking advantage of underutilized storage and data management space.

In the example embodiment 100, the storage volume 116, the base VM 104 and the cloned VMs 106, can be cloned 110 within the server 102, to create a plurality of cloned storage volumes 114, comprising clones 112 of the base VM 104. In this way, numerous cloned VMs can be created in an enterprise system, for example, all of which can comprise the base framework of the base VM 104.

Figure 2:
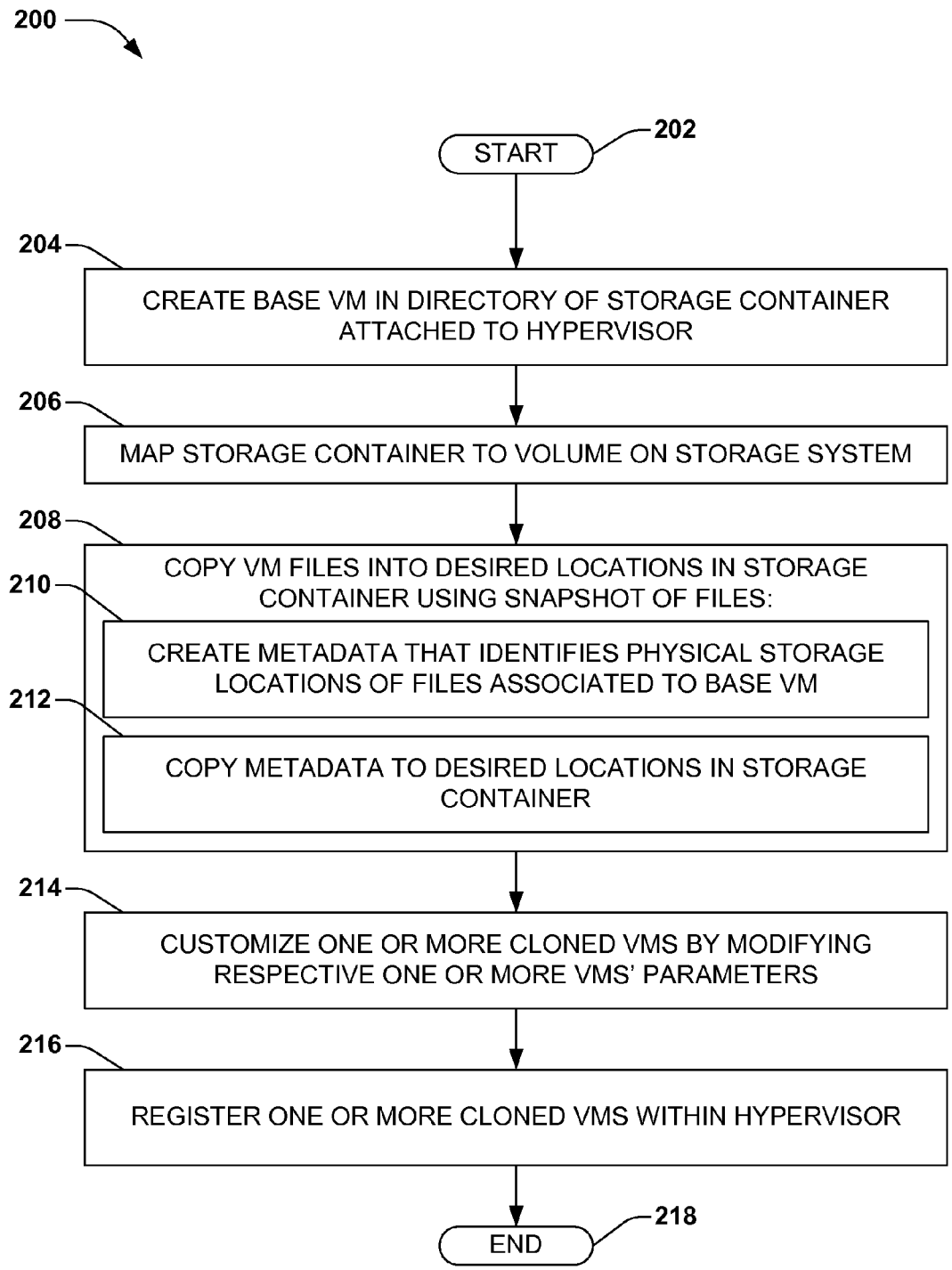
FIG. 2 is a flow diagram of an exemplary method for creating thin clones of a virtual machine (VM) using the VM's associated storage system to copy and deduplicate storage for the VMs.

FIG. 2 is a flow diagram of an exemplary method 200 for creating thin clones of a virtual machine (VM) using the VM's associated storage system to copy and deduplicate storage for the VMs. The exemplary method 200 begins at 202 and involves creating a base VM in a directory of a storage container (e.g. a data store) attached to a hypervisor, at 204. For example, a VM hosting server may be operating a hypervisor, and may also be acting as a storage server in a storage system. In this example, a base VM can be created in the VM hosting server that may be a "gold standard" VM for an enterprise, and the VM can be listed in the directory of the server. The "gold standard" VM may comprise an operating system that is configured to operate a specified set of applications in a manner specified by the enterprise. In this way, a same "gold standard" VM can be cloned and used throughout an enterprise, for example.

At 206, the storage container (e.g., a storage server) can be mapped to a storage volume in the storage system (e.g., in an enterprise system). For example, one can determine which storage container the base VM is located, and in which storage volume of the storage system the storage container is located. In this example, a connection can be made between the base VM, its storage container and the storage volume in which it's stored by the mapping.

At 208, VM files can be copied into one or more desired locations in the storage container, using a snapshot of the files. For example, a snapshot can be a locally retained, read-only, point-in-time image of data. In one embodiment, a snapshot can take typically less than one second to create regardless of the size of the files. In this embodiment, after a snapshot copy has been created, changes to data objects are often reflected in updates to a current version of the data objects as if snapshot copies did not exist, while the snapshot version of the data remains stable, for example.

At 210, the copying can comprise creating metadata that identifies physical storage locations of files associated to the base VM without taking additional space on the storage system. For example, metadata can comprise file locations of the files associated to the base VM. In one embodiment, a snapshot of the files can comprise read-only metadata of the file locations at point-in-time of the snapshot. At 212, the metadata can be copied to one or more desired locations in the storage container. In this way, for example, if merely the metadata is copied onto storage in the storage container files associated to the VM may not need to be copied. In this example, copying merely the metadata can mitigate duplication of files associated to the VM (e.g., deduplication).

In one embodiment, the copying of the snapshot of the files associated to the VM, comprising the metadata for the physical location of the files in storage, can create a clone of the VM on the storage container. In this embodiment, for example, the cloned VM can utilize the files associated to the base VM on the storage container, as the metadata created and copied to the cloned VM's location identifies a physical location of the base VM files. As an example, a portion of Perl code for cloning a file from a snapshot of a base VM file to a new path for a cloned VM in the storage container may include the following:

```
$resultValue = $Server->invoke('clone-start',
    'source-path',
        '/vol/vol1/.snapshot/base.0/vm_base/vm_base.vmdk',
    'destination-path',
        '/vol/vol1/vm1/vm1.vmdk',
    'no-snap',
        'true' );
$clone_id = $resultValue->child_get_int( 'child-id', 0 );
```

In this example, this process can be completed for respective files associated to the base VM, thereby copying the files to the desired location in the storage container.

At 214, in the exemplary method 200, one or more cloned VMs can be customized by modifying a VM's parameters, for the respective one or more cloned VMs. For example, one may wish to individualize respective cloned VMs within the hypervisor environment, which can be performed in a manner that is acceptable to the hypervisor. In this example, respective hypervisors may have different protocols for customizing a VM, therefore, customization can include determining a hypervisor's protocols for customization.

In one embodiment, customizing a VM can be performed by manually changing configuration files associated to the cloned VM by parsing a file's contents and changing parameters as desired. As an example, customizing the one or more cloned VMs can comprise remotely accessing a hypervisor environment and issuing one or more commands to query a cloned VM's parameters. Further, in this example, after a VM's parameters are returned from the query, they can be modified to customize the VM.

In another embodiment, application programming interface (API) calls can be used within a hypervisor infrastructure to implement a customization of respective cloned virtual machines. As an example, a portion of Perl code for customizing a cloned VM may include the following:

```
my @ConfigurationDeleteFiles = (
    '^restore_symboltable$',
    '^hypervisor.*\.log$',
    '\.vmxf$',
);
my @ConfigurationDeleteLines = (
    "extendedConfigFile",
    "^ethernet[0-9].generatedAddress",
    "^uuid.bios",
    "^uuid.location",
    "^sched.swap.derivedName*",
    "^sched.swap.dir",
    "^ide[0-9]:[0-9].fileName"
);
# remove unneeded configuration file; can be regenerated if needed
foreach $file ( @ConfigurationDeleteFiles ) {
    unlink( "/vol/vol1_clone/vm1/$file" );
}
# remove main configuration file contents; can be custom regenerated
LINELOOP: foreach $line ( @myHyperVisorConfigurationFile ) {
    foreach $deleteLine ( @ConfigurationDeleteLines ) {
        next LINELOOP if ( $line =~ m/$deleteLine/ );
    }
    push( @myNewFile, $line );
}
```

In this example, where appropriate, it may be preferable to utilize API interfaces to implement this code.

It will be appreciated that the techniques and systems, described herein, are not limited to customizing a cloned VM using the embodiments described above. Those skilled in the art may devise alternated customization embodiments, which could be utilized by the techniques and systems, described herein.

At 216, in the exemplary embodiment 200, one or more of the cloned VMs can be registered within a hypervisor environment. VM registration is typically dependent upon the hypervisor (e.g., respective hypervisors may have different ways of registering VMs), but registration can allow the hypervisor to recognize a cloned VM as a valid entity within the hypervisor environment, for example. In one embodiment, for example, a portion of Perl code for registering a cloned VM to a hypervisor may include the following:

```
$resultValue = $hypervisorHost->RegisterVM_Task(
    { "path", "/vol/vol1_clone/vm1/vm1.vmx",
      "name", "vm1_clone" } );
```

Having registered the one or more cloned VM within the hypervisor, the exemplary method 200 ends at 218.

In one aspect, as described in FIG. 1 above, an enterprise may wish to create large pools of VMs for their business (e.g., for virtual storage solutions, virtual workstations, application testing, etc.), for example. In this aspect, a storage container that comprises several VMs (e.g., cloned from a base VM), for example, can be cloned on a storage volume in the enterprise's storage system. In this way, in this example, the storage volume can comprise multiple clones of the storage container, which in turn comprises multiple clones of the base VM. In one embodiment, an efficient deployment model for cloning both the VMs and the storage container may be needed when large pools of VMs are to be utilized by an enterprise, for example.

Figure 3:
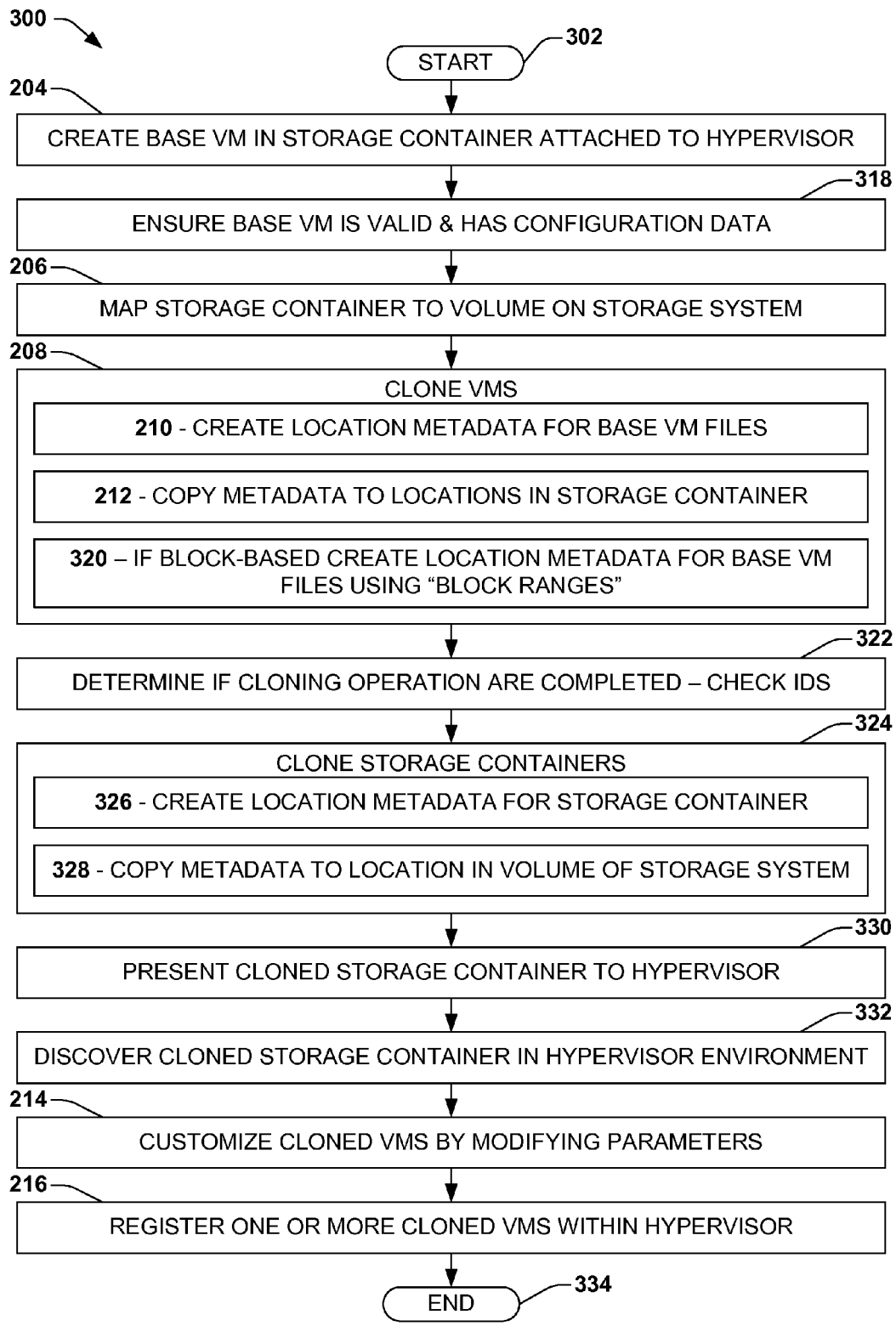
FIG. 3 illustrates one example embodiment of techniques for creating thin clones of a virtual machine (VM) using the VM's associated storage system to copy and deduplicate storage for the VMs.

FIG. 3 illustrates an exemplary embodiment of a method 300 for efficiently creating thin clones of a virtual machine (VM) using techniques for cloning a storage container within a storage volume. The exemplary embodiment of the method 300 begins at 302 and involves creating a base VM in a directory of a storage container attached to a hypervisor, at 204 (as in FIG. 2, 200). At 318, it can be determined whether the base VM is valid within the hypervisor context, and whether the base VM comprises desired configuration data. For example, VMs may not operate appropriately in a particular hypervisor unless certain configuration information and data is present for the VM. In this example, different hypervisors may require different configuration information and data; therefore, in order for cloned VMs to be valid, one can determine whether the base VM is valid within the utilized hypervisor environment. More specifically, in this example, whether the base VM comprises appropriate configuration information and data to operate within the hypervisor environment utilized by a system.

At 206, as described in FIG. 2, 200, the storage container (e.g., a storage server) can be mapped to a storage volume in the storage system (e.g., in an enterprise system). Further, as described above, at 208, VM files can be copied into one or more desired locations in the storage container, using a snapshot of the files, which can comprise creating metadata that identifies physical storage locations of files associated to the base VM, at 210. Further, as described above, at 212, the metadata can be copied to one or more desired locations in the storage container (see FIG. 2, 200).

At 320, if the storage container for the base VM files comprises block-based hypervisor objects (e.g., logical unit number (LUN) based objects), copying base VM clones can comprise creating location metadata for the base VM files using "block ranges." For example, the metadata creation involves range blocks within the container. In this example, the copying can specify a target block-based range in the storage container for the cloned VM's metadata information.

In one embodiment, for example, a portion of Perl code for copying "block-based" files associated to the base VM may include the following:

```
$blockRange[0] = { 12, 12300, 24232 }; # clone 11932 blocks
at offset 12
$resultValue = $Server->invoke('clone-start',
    'source-path',
        '/vol/vol1/.snapshot/gold.0/lun1.lun',
    'destination-path',
        '/vol/vol1/lun1.lun',
    'block-ranges',
        @blockRanges,
    'no-snap',
        'true' );
$clone_id = $resultValue->child_get_int( 'child-id', 0 );
```

In this embodiment, implementation of the creation and copying is similar to non-block-based objects, however this embodiment utilizes "block-ranges" to specify which blocks in the storage container, comprising the VM files, to clone.

At 322, in the exemplary embodiment of the method 300, VM clone IDs can be checked to determine whether a cloning operation is completed. In one embodiment, for example, as clone IDs are returned from a cloning operation (e.g., cloning operations as in 208), they can be checked against respective clone-start invokes from the cloning operation. In one embodiment, for example, a portion of Perl code for determining whether a cloning operation is completed may include the following:

```
$done = 0;
while ( !$done ) {
    $resultValue = $Server->invoke( 'clone-list-status',
        'clone-id',
            0 );
    $clones = $resultValue->child_get( 'status' );
    $done = 1;
    foreach $status ( $clones->children_get( ) ) {
        next if $status->child_get( 'clone-state' ) eq "completed";
        die if $status->child_get( 'clone-state' ) eq "failed";
        $done = 0;
    }
}
```

In this way, in this example, it may be determined whether respective clone VMs have been appropriately completed.

At 324, the storage container, comprising one or more VMs (e.g., a base VM and one or more clone VMs), can be mapped to a volume on a storage system using a snapshot of the storage container. As described above, a snapshot can be a locally retained, read-only, point-in-time image of data, for example, metadata that identifies physical storage locations of files. At 326, mapping the one or more storage containers can comprise creating metadata that indicates a physical storage location of the storage container (e.g., a data store). As an example, the snapshot can comprise the metadata for the storage container at a point-in-time of the snapshot. Further, at 328, the metadata can be copied to a desired location in the storage volume of a storage system.

In one embodiment, copying the metadata to a desired location can comprise making the metadata available for clones of the storage container. In this embodiment, after VM cloning operations are determined to be completed, the volume cloning operation can be performed, for example, using a portion of Perl code, which may include the following:

```
$resultValue = $Server->invoke( 'volume-clone-create',
            'parent-volume',
                    '/vol/vol1',
            'volume',
    '/vol/vol1_clone' );
```

In the exemplary embodiment of the method 300, at 330, one or more cloned storage containers can be presented to the hypervisor. In this embodiment, for example, in order to be able to customize and register cloned VMs, one can present cloned storage containers to the hypervisor by making the hypervisor aware of the cloned storage containers. In one embodiment, for network attached storage (NAS) devices, the presenting can be provisioned as a network file system (NFS) export. As an example, a portion of Perl code for provisioning as a NFS export may include the following:

```
$rules[0] = { "pathname",
                "/vol/vol1_clone" };
$resultValue = $Server->invoke( 'nfs-exportfs-append-rules',
            'persistent',
                    'true',
            'rules',
                    @rules );
```

In another embodiment, for NAS devices, the presenting can be provisioned as a Common Internet File System (CIFS) share. As an example, a portion of Perl code for provisioning as a CIFS share may include the following:

```
$resultValue = $Server->invoke( 'cifs-share-add',
            'path',
                    '/vol/vol1_clone',
            'share-name',
                    'vol1_clone' );
```

In another embodiment, for storage area network (SAN) devices, presenting the cloned storage container, comprising block-based objects (e.g., LUNs), can involve bringing a block-based object in the storage container online and mapping it to the hypervisor. As an example, a portion of Perl code for bringing a block-based object in the storage container online and mapping it to the hypervisor may include the following:

```
$resultValue = $Server->invoke( 'lun-online',
            'path',
                    '/vol/vol1_clone/lun1.lun' );
$resultValue = $Server}->invoke( 'lun-map',
            'initiator-group',
                    'hypervisor-group',
            'path',
                    '/vol/vol1_clone/lun1.lun' );
```

It will be appreciated that the techniques and systems, described herein, are not limited to presenting a cloned storage container to the hypervisor using the embodiments described above. Those skilled in the art may devise alternate techniques for presenting cloned storage containers to the hypervisor, which can be utilized by the methods described above.

At 332, in the exemplary embodiment of the method 300, a cloned storage container can be discovered in the hypervisor environment. As an example, depending on the hypervisor utilized, a cloned storage container may need to be discovered in the hypervisor environment. In one embodiment, discovery of the cloned storage container can involve refreshing existing storage host bus adapters (HBAs) to scan for new block-based storage objects. In this embodiment, for example, a portion of Perl code for rescanning on a hypervisor may include the following:

```
$resultValue = $HypervisorHostStorage->RefreshStorageSystem( );
$resultValue = $HypervisorHostStorage->RefreshAllHba( );
$resultValue = $HypervisorHostStorage->RefreshVMFS( );
```

In another embodiment, for NAS devices, the hypervisor may need to refresh for new shares (e.g., as in CIFS) or exports (e.g., as in NFS) available from the storage system. As an example, a portion of Perl code for adding new exports on a hypervisor environment may include the following:

```
$storageObject[0] = { 'remotePath',
                    '/vol/vol1_clone',
            'remoteHost',
                    $storageServer,
            'localPath', '/vmfs/volumes/vol1_clone' };
$resultValue=$HvisorDatastore->CreateNasDatastore( @storageObject);
```

After a storage container is presented and discovered by the hypervisor, at 214, one or more cloned VMs can be customized by modifying a VM's parameters, for the respective one or more cloned VMs, as described above (FIG. 2, 200). Further, at 216, one or more of the cloned VMs can be registered within a hypervisor environment, as described above (FIG. 2, 200). Having registered the one or more cloned VM within the hypervisor, the exemplary embodiment of the method 300 ends at 334.

Figure 4:
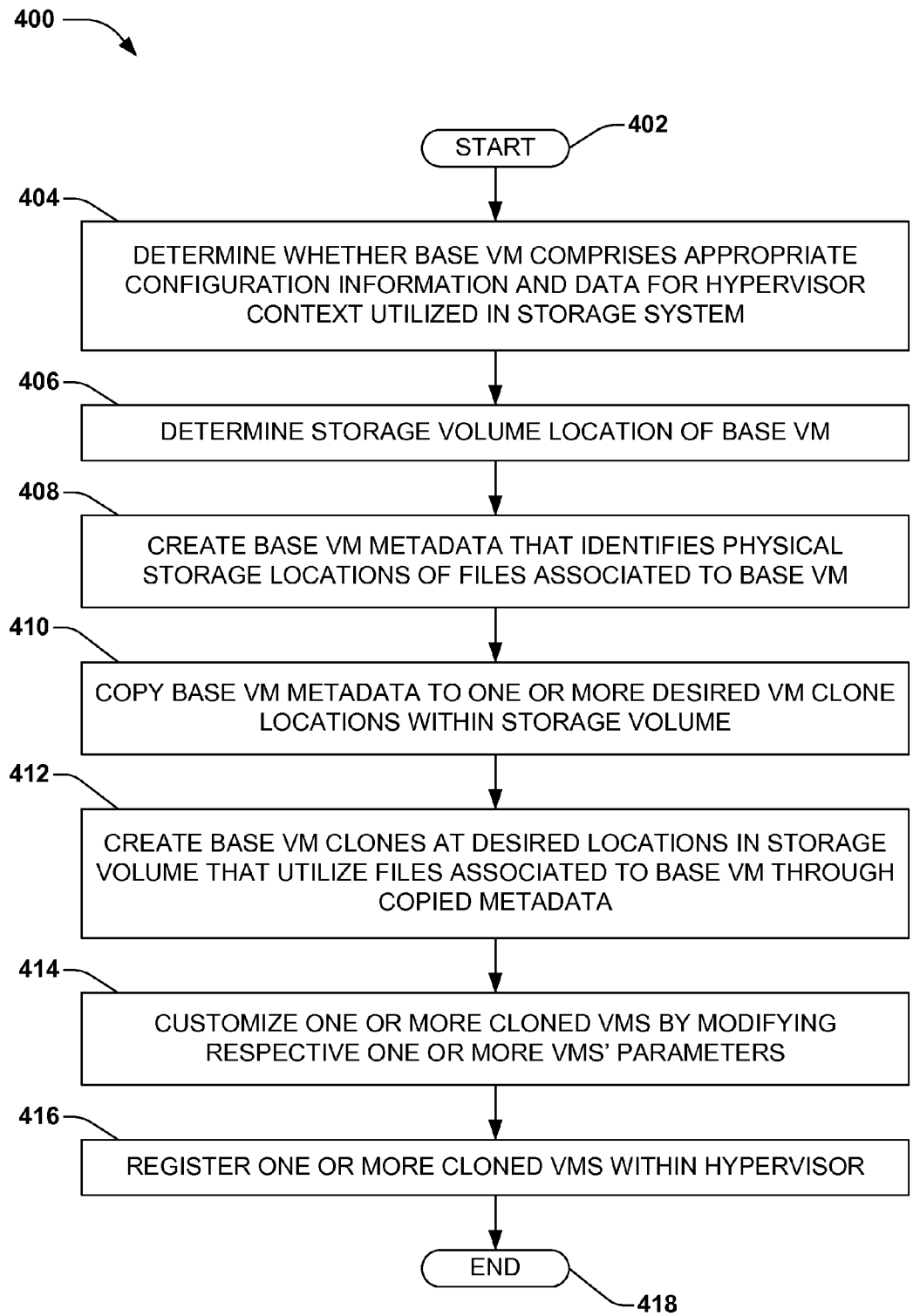
FIG. 4 is a flow chart diagram of one exemplary embodiment of a method for creating thin clones of a virtual machine (VM) using the VM's associated storage system to copy and deduplicate storage for the VMs.

FIG. 4 is a flow chart diagram of another exemplary embodiment 400 of a method for creating thin clones of a VM using the VM's associated storage system to copy and deduplicate storage for the VMs. The exemplary embodiment 400 of the method begins at 402 and involves determining whether the base VM comprises appropriate configuration information and data for a hypervisor context utilized in the storage system, at 404. For example, one may wish to determine whether the VM is valid within the hypervisor context, as previously described.

At 406, the exemplary embodiment 400 of the method comprises determining a location of the base VM, which will be used for cloning, on the storage volume. For example, a one may wish to map a location of the base VM to the storage volume in order to create appropriate metadata. At 408, metadata for the base VM can be created, which can identify a physical storage location of files that are associated to the base VM. For example, metadata (data about data) can identify locations for the base VM files so that the base VM can be properly cloned.

At 410, the base VM metadata is copied to one of more desired locations for the proposed VM clones within the storage volume. For example, the metadata that identifies location of the files associated to the base VM can be copied to other locations on the storage volume on which the base VM is located. At 412, clones are created for the base VM at the desired locations on the storage volume, utilizing the metadata that identifies locations of files associated to the base VM. In this way, for example, the newly created clones of the base VM do not need to have copies of the base VM's files, merely the metadata that shows where the files are located (e.g., created clones that deduplicated the base VMs associated files).

At 414, the one or more cloned VMs are customized by modifying their respective parameters. As described above, in order to distinguish respective clones from one another, for example, respective clones can be customized. At 416, the one or more cloned VMs are registered within the hypervisor. As described above, in order for the hypervisor to be recognized the newly created clones, for example, they can be registered within the hypervisor. Having registered the cloned VMs the exemplary embodiment 400 of the method ends at 418.

Figure 7:
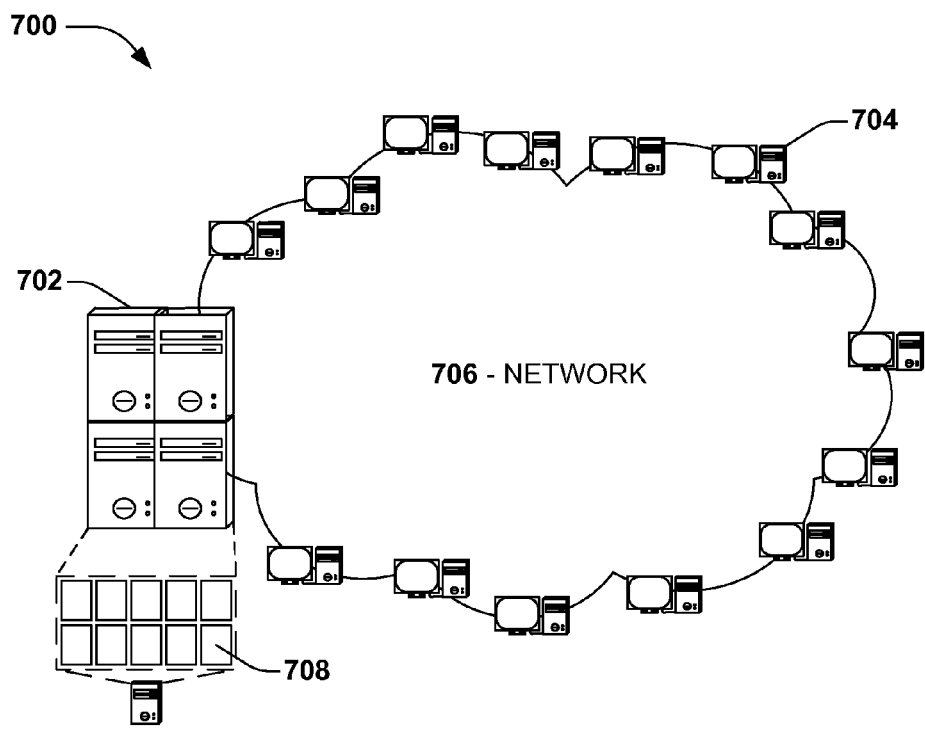
FIG. 7 is an illustration of an exemplary embodiment of an environment in which virtual machine cloning may be implemented as described herein.

FIG. 7 is an illustration of an exemplary embodiment of an environment 700 in which virtual machine cloning may be implemented as described herein. An enterprise storage system 702 (e.g., used for enterprise data management and storage) may comprise several storage volumes, such as storage servers. In this embodiment, respective storage volumes can be attached to a network 706 utilized by the enterprise for data management and storage, for example, in remote locations operated by the enterprise. Utilizing the techniques described above, one may clone a base virtual machine (VM) that is a "gold standard" for the enterprise, for example, and clone the storage container (e.g., data store) to which the VM is associated (e.g., that houses the base VM's files), to create a plurality of cloned VMs 708 on one or more storage volumes in the storage system 702. In this way, in this example, the plurality of cloned VMs 708, may be deployed to the network 706, to be utilized by workstations 704, for example, respectively comprising a "gold standard" VM.

Figure 5:
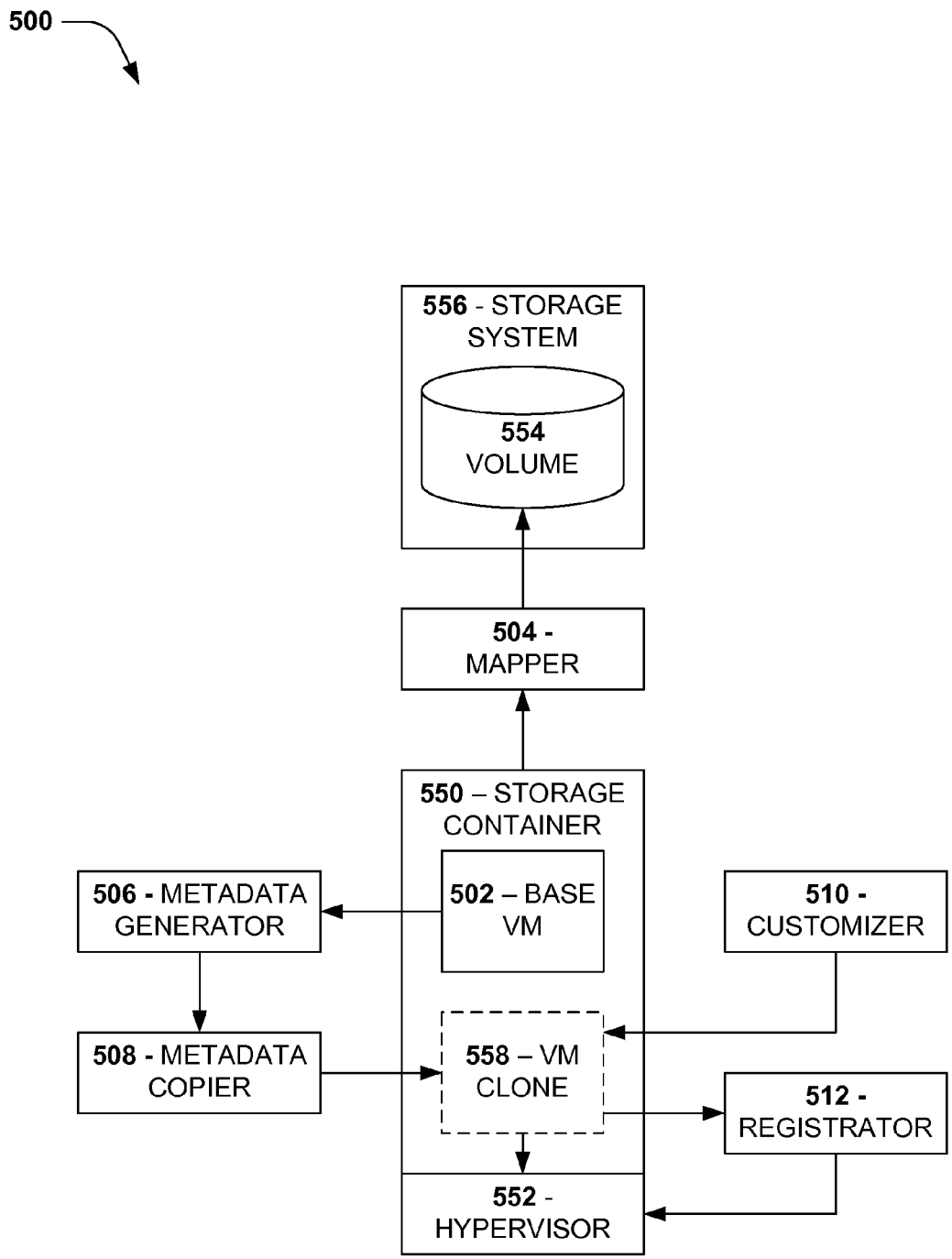
FIG. 5 is a component block diagram of an exemplary system for creating thin clones of a virtual machine (VM) using the VM's associated storage system to copy and deduplicate storage for the VMs.

A system may be devised for creating thin clones of a virtual machine (VM). FIG. 5 is a component block diagram of an exemplary system 500 for creating thin clones of a virtual machine (VM) using the VM's associated storage system to copy and deduplicate storage for the VMs. The exemplary system 500 comprises a base VM 502 in a directory of a storage container 550 attached to a hypervisor 552. In one embodiment, a storage container 550, such as a data store, can be attached to a hypervisor 552 (e.g., a hypervisor running on a storage volume that contains the data store). In this embodiment, for example, a base VM 502 can be created and operated in the hypervisor environment, having files associated to the base VM 502 located on the storage container 550. Further, in this example, the base VM 502 can comprise a "gold standard" framework of an operating system, applications, and associated configurations for an enterprise.

The exemplary system 500 further comprises a mapping component 504, which can be configured to map the storage container 550 to a volume 554 on a storage system 556. In this way, for example, a physical location of files associated to the base VM 502 can be identified on the storage container 550, in the storage volume 554. In this example, identifying a physical storage location of the files associated to the base VM 502 may be used to clone the base VM 502.

The exemplary system 500 further comprises a physical storage metadata generator 506, which can be configured to generate metadata identifying a location of files associated to the base VM 502 in physical storage 550. In one embodiment, the physical storage metadata generator 506 can take a snapshot, comprising a read-only, point-in-time image of data, of the metadata that identifies the physical storage locations of the files associated to the base VM 502.

In the exemplary system 500, a metadata copier 508 can be configured to copy metadata identifying a location of files associated to the base VM in physical storage 550 to a new location within the storage container 550. In one embodiment, the metadata copier 508 can copy metadata, which identify the physical storage locations of the files associated to the base VM 502 generated by the metadata generator 506, to a desired location in the storage container, 550, for example, in order to create a clone VM 558 in the storage container 550. In this way, in this example, a VM clone 558 can be a thin clone that utilizes the files associated to the base VM 502, instead of duplicating the files.

The exemplary system 500 further comprises a cloned VM customization component 510, which can be configured to utilize one or more application programming interfaces (APIs) to customize one or more cloned VMs 558 parameters. In one embodiment, for example, respective cloned VMs can be individualized within the hypervisor 552 environment, which can be performed in a manner that is acceptable to the hypervisor. In this example, API calls can be used within the hypervisor 552 to customize cloned VM 558.

In another embodiment, the cloned VM customization component 510 can comprise a hypervisor accessing component that is configured to remotely access the hypervisor environment, a VM querying component that is configured to issue commands to query one or more of a cloned VM's parameters, and a VM parameter modification component configured to modify one or more VM parameters. In this embodiment, for example, using the hypervisor accessing component one can remotely access the hypervisor 552 to customize the one or more cloned VMs 558. In this example, using the VM querying component, one can issue one or more commands to query a cloned VM's parameters, and using the VM parameter modification component, after a VM's parameters are returned from the query, one can modify the parameters to customize the VM.

In the exemplary system 500, a cloned VM registration component 512 can be configured to register the one or more cloned VMs 558 within the hypervisor 552. For example, VM registration can depend on the hypervisor, and in one embodiment, using the cloned VM registration component 512 can allow the hypervisor to recognize the cloned VM 558 as a valid entity within the hypervisor 552.

Figure 6:
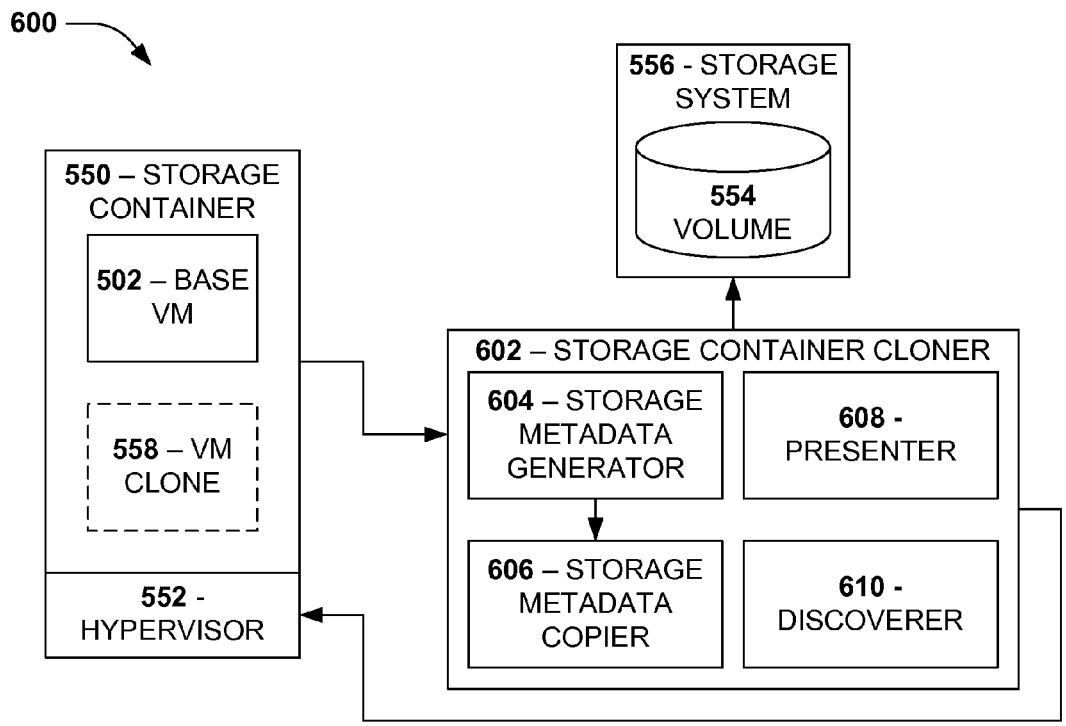
FIG. 6 is a component block diagram of an exemplary embodiment of one or more components of a system for creating thin clones of a virtual machine (VM) using the VM's associated storage system to copy and deduplicate storage for the VMs.

FIG. 6 is a component block diagram of one exemplary embodiment 600 of the exemplary system 500, whereby a storage container 550, comprising one or more cloned VMs 558, may be cloned within a storage volume 554. In the exemplary embodiment 600, a base VM validator 612 can be configured to determine whether the base VM 502 comprises desired configuration data. For example, for a VM to operate appropriately in a particular hypervisor, the VM should comprise appropriate configuration information and data. Therefore, in this example, the base VM validator 612 can determine whether the base VM is valid within the utilized hypervisor environment, so that the cloned VMs may be valid.

In the exemplary embodiment 600, a storage container cloner 602 may be configured to map the storage container 550 having one or more VMs 502 & 558 to a volume 554 on the storage system 556 using a snapshot of the storage container 550. In this embodiment, the storage container cloner 602 can comprise a storage container metadata generator 604, which may be configured to generate metadata identifying a location of files associated to the storage container 550. As an example, the storage container metadata generator 604 can create metadata that indicates a physical storage location of the storage container (e.g., a data store). In this example, a snapshot can be taken of the metadata for the storage container at a point-in-time of the snapshot.

The storage container cloner 602 can further comprise a metadata copier 606, which can be configured to copy metadata identifying a location of files associated to the storage container 550 to one or more locations within the volume 554 on the storage system 556. In one embodiment, copying the metadata to a desired location can comprise the metadata copier 606 making the metadata available for clones of the storage container 550.

In the exemplary embodiment 600, the storage container cloner 602 can further comprise a storage container presentation component 608, which can be configured to present a cloned mapped storage container to the hypervisor 552. For example, the storage container presentation component 608 can present cloned storage containers to the hypervisor 552 by making the hypervisor aware of the cloned storage containers. In one embodiment, for network attached storage (NAS) devices, the storage container presentation component 608 can provision the presenting as a network file system (NFS) export. In another embodiment, for NAS devices, the storage container presentation component 608 can provision the presenting as a Common Internet File System (CIFS) share. In another embodiment, for storage area network (SAN) devices, where the cloned storage container is comprised of block-based objects (e.g., LUNs), the storage container presentation component 608 can bring a block-based object in the storage container online and map it to the hypervisor.

In the exemplary embodiment 600, the storage container cloner 602 can further comprise a storage container discovery component 610, which can be configured to discover a cloned mapped storage container in a hypervisor environment 552. Discovery of the cloned storage container may depend on the hypervisor utilized. In one embodiment, the storage container discovery component 610 can facilitate discovery of the cloned storage container by refreshing existing storage host bus adapters (HBAs) to scan for new block-based storage objects.

It will be appreciated that, while the exemplary systems shown in FIGS. 5 and 6 illustrate system components located in specific locations, the system described herein is not limited to having these components at the illustrated positions. For example, a system may be configured that comprises cloned VMs in a storage container, on a volume comprised of a single physical storage server in a storage system of multiple storage servers. In these embodiments, the components in the exemplary system may be located on a single physical server and/or on multiple physical servers within a data management and/or storage system.

Computer programming may be configured to create thin clones of a virtual machine (VM) using the VM's associated storage system to copy and deduplicate storage for the VMs. The computer programming may be comprised in a computer useable medium, which when executed on a computing device, can cause the computing device to create a base VM in a directory of a storage container attached to a hypervisor. Further, the computer programming can cause the computing device to copy respective files associated to the base VM into one or more new locations within the storage container using a snapshot of the respective files associated to the base VM, which can comprise creating metadata that acts as a reference pointer to physical storage locations of the files associated to the base VM, and copying the metadata to the one or more new locations within the storage container. Additionally, the computer programming can cause the computing device to customize the one or more cloned VMs by modifying the respective one or more VM's parameters, and register the one or more cloned VMs within the hypervisor.

Figure 8:
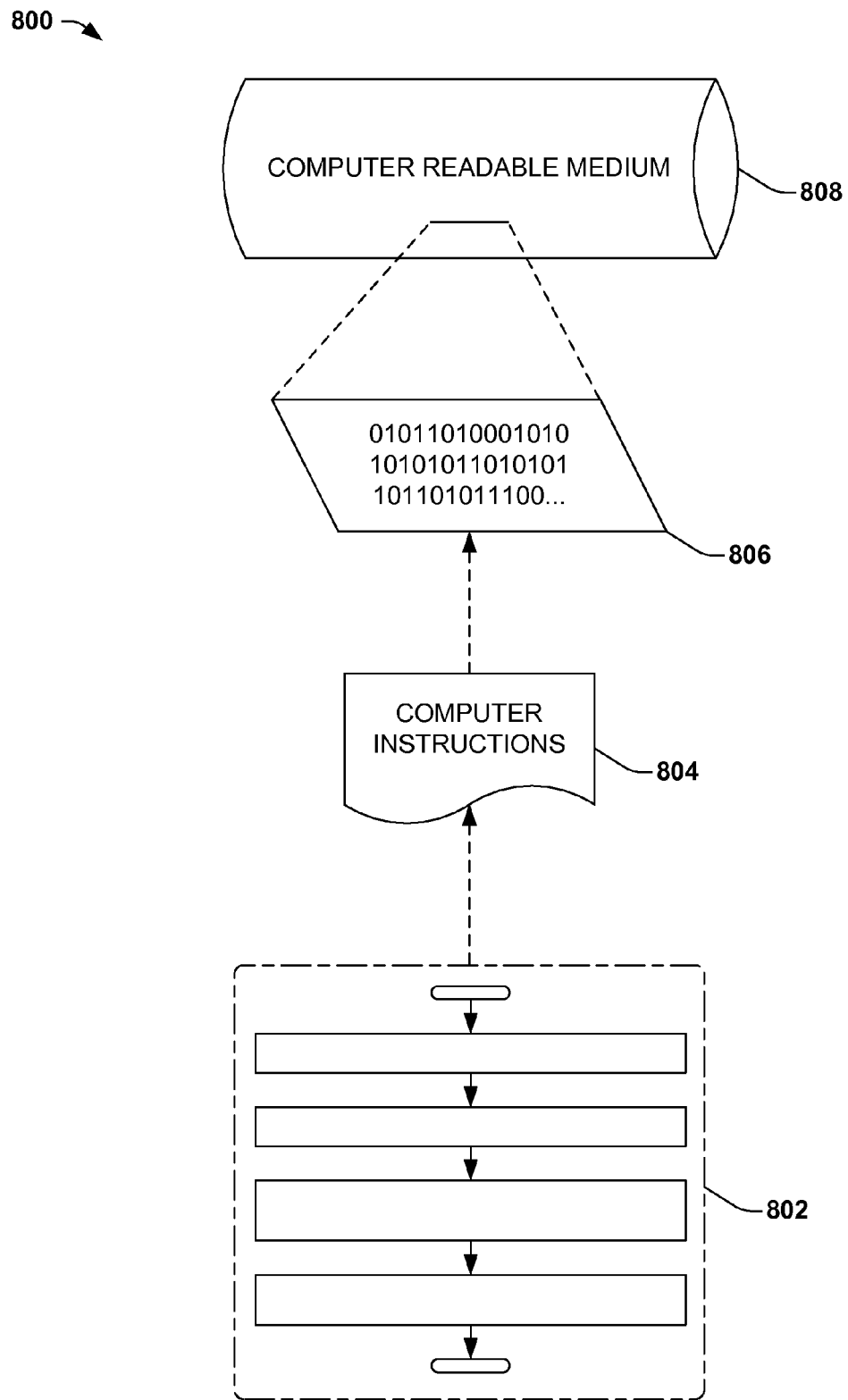
FIG. 8 is an illustration of an exemplary computer-useable medium comprising processor-executable instructions configured to embody one or more of the provisions set forth herein.

An exemplary computer-useable medium that may be devised in these ways is illustrated in FIG. 8, wherein the implementation 800 comprises a computer-useable medium 808 (e.g., a flash-drive, downloadable programming, CD-R, DVD-R, or a platter of a hard disk drive), on which is encoded computer-readable data 806. This computer-readable data 806 in turn comprises a set of computer instructions 802 configured to operate according to one or more of the principles set forth above. In one such embodiment, the processor-executable instructions 804 may be configured to perform the steps described in the exemplary method 200 of FIG. 2.

In another such embodiment, the processor-executable instructions 802 may be configured to implement a system, such as the exemplary system 500 of FIG. 5, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be appreciated that processes, architectures and/or procedures described herein can be implemented in hardware, firmware and/or software. It will also be appreciated that the provisions set forth herein may apply to any type of special-purpose computer (e.g., file server, filer and/or storage serving appliance) and/or general-purpose computer, including a standalone computer or portion thereof, embodied as or including a storage system. Moreover, the teachings herein can be adapted to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

The operations herein described are exemplary and imply no particular order. Further, the operations can be used in any sequence when appropriate and can be partially used (e.g., not all actions may be necessary). It should be understood that various computer-implemented operations involving data storage may comprise manipulation of physical quantities that may take the form of electrical, magnetic, and/or optical signals capable of being stored, transferred, combined, compared and/or otherwise manipulated, for example.

Computer useable media is intended to comprise any mechanism that can store data, which can be thereafter, be read by a computer system. Examples of computer readable media include hard drives (e.g., accessible via network attached storage (NAS)), Storage Area Networks (SAN), volatile and non-volatile memory, such as read-only memory (ROM), random-access memory (RAM), EEPROM and/or flash memory, CD-ROMs, CD-Rs, CD-RWs, DVDs, cassettes, magnetic tape, magnetic disk storage, optical or non-optical data storage devices and/or any other medium which can be used to store data. Computer useable media may also comprise communication media, which typically embodies computer readable instructions or other data in a modulated data signal such as a carrier wave or other transport mechanism (e.g., that has one or more of its characteristics set or changed in such a manner as to encode information in the signal). The computer useable medium can also be distributed (e.g., using a switching fabric, such as used in computer farms) over a network-coupled computer system so that computer readable code is stored and executed in a distributed fashion.

The foregoing description has been directed to particular embodiments. It will be apparent, however, that other variations and modifications may be made to the described embodiments, with the attainment of some or all of their advantages. Specifically, it should be noted that one or more of the principles set forth herein may be implemented in non-distributed file systems. Furthermore, while this description has been written in terms of separate remote and support systems, the teachings are equally suitable to systems where the functionality of the remote and support systems are implemented in a single system. Alternately, the functions of remote and support systems may be distributed among any number of separate systems, wherein respective systems perform one or more of the functions. Additionally, the procedures, processes and/or modules described herein may be implemented in hardware, software, embodied as a computer-readable medium having program instructions, firmware, or a combination thereof. Therefore, it is the object of the appended claims to cover all such variations and modifications as come within the spirit and scope of the disclosure herein.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

One aspect of the subject matter described herein involves a computer system configured to store, in a storage system, a set of virtual machine images. It will be appreciated that this may be implemented in this computer system, e.g., as a virtual machine managing component, which is configured to make a thin clone of a virtual image according to the subject matter discussed herein.

Moreover, the word "exemplary" is used herein to mean serving as an example, instance, or illustration. That is anything described herein as "exemplary" is not necessarily to be construed as advantageous over other aspects or designs. Also, unless specified to the contrary, the term "or" is intended to mean an inclusive "or" rather than an exclusive "or", and the articles "a" and "an" are generally to be construed to comprise "one or more". Furthermore, to the extent that the terms "includes", "having", "has", "with", or variants thereof are used, such terms are intended to be inclusive in a manner similar to the term "comprising".

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure.

What is claimed is:

1. A method for virtual machine cloning, comprising:
   identifying a storage container comprising a base virtual machine;
   generating storage container metadata identifying a storage location used by the storage container to store base virtual machine data associated with the base virtual machine;
   generating a cloned storage container comprising a cloned virtual machine that is a thin clone of the base virtual machine;
   providing the cloned storage container with access to the storage location using the storage container metadata; and
   providing the cloned virtual machine, using the storage container metadata, with access to operating system data comprised within the base virtual machine data for use as an operating system for the cloned virtual machine, the cloned virtual machine not comprising the operating system data.

2. The method of claim 1, comprising:
   presenting the cloned storage container to a hypervisor as a network file system (NFS) export.

3. The method of claim 1, comprising:
   presenting the cloned storage container to a hypervisor as a common internet file system (NFS) share.

4. The method of claim 1, comprising:
   refreshing a storage host bus adapter to discover the cloned storage container based upon a scan for new block-based storage objects.

5. The method of claim 1, the generating a cloned storage container comprising:
generating the cloned the storage container to comprise a plurality of cloned virtual machines that are thin clones of the base virtual machine.

6. The method of claim 1, the storage container comprising a storage server.

7. The method of claim 1, comprising:
using configuration data comprised within the cloned virtual machine to execute the operating system using the operating system data comprised within the base virtual machine data.

8. The method of claim 1, comprising:
providing the cloned virtual machine, using the storage container metadata, with access to application data comprised within the base virtual machine data for execution of an application by the cloned virtual machine, the cloned virtual machine not comprising the application data.

9. The method of claim 8, comprising:
using configuration data comprised within the cloned virtual machine to execute the application using the application data comprised within the base virtual machine data.

10. The method of claim 1, comprising:
modifying a virtual machine parameter of the cloned virtual machine to customize the cloned virtual machine as distinguishable from the base virtual machine.

11. The method of claim 1, comprising:
registering the cloned virtual machine within a hypervisor environment.

12. A system for virtual machine cloning, comprising:
a storage container cloner configured to:
identify a storage container comprising a base virtual machine;
generate storage container metadata identifying a storage location used by the storage container to store base virtual machine data associated with the base virtual machine;
generate a cloned storage container comprising a cloned virtual machine that is a thin clone of the base virtual machine;
provide the cloned storage container with access to the storage location using the storage container metadata; and
provide the cloned virtual machine, using the storage container metadata, with access to application data comprised within the base virtual machine data for execution of an application by the cloned virtual machine, the cloned virtual machine not comprising the application data.

13. The system of claim 12, the storage container cloner configured to:
provide the cloned virtual machine, using the storage container metadata, with access to operating system data comprised within the base virtual machine data for use as an operating system for the cloned virtual machine, the cloned virtual machine not comprising the operating system data.

14. The system of claim 13, the storage container cloner configured to:
use configuration data comprised within the cloned virtual machine to execute the operating system using the operating system data comprised within the base virtual machine data.

15. The system of claim 12, the storage container cloner configured to:
use configuration data comprised within the cloned virtual machine to execute the application using the application data comprised within the base virtual machine data.

16. The system of claim 12, the storage container cloner configured to:
present the cloned storage container to a hypervisor as at least one of a network file system (NFS) export or a common internet file system (NFS) share.

17. A computer-readable device comprising processor-executable instructions that when executed perform a method for virtual machine cloning, comprising:
identifying a storage container comprising a base virtual machine;
generating storage container metadata identifying a storage location used by the storage container to store base virtual machine data associated with the base virtual machine;
generating a cloned storage container comprising a cloned virtual machine that is a thin clone of the base virtual machine;
providing the cloned storage container with access to the storage location using the storage container metadata; and
modifying a virtual machine parameter of the cloned virtual machine to customize the cloned virtual machine as distinguishable from the base virtual machine.

18. The computer-readable device of claim 17, the method comprising:
providing the cloned virtual machine, using the storage container metadata, with access to operating system data comprised within the base virtual machine data for use as an operating system for the cloned virtual machine, the cloned virtual machine not comprising the operating system data.

19. The computer-readable device of claim 17, the method comprising:
providing the cloned virtual machine, using the storage container metadata, with access to application data comprised within the base virtual machine data for execution of an application by the cloned virtual machine, the cloned virtual machine not comprising the application data.

20. The computer-readable device of claim 17, the method comprising:
providing the cloned virtual machine with access to the base virtual machine data for execution by the cloned virtual machine while stored at the storage location and associated with the base virtual machine.

* * * * *